(12) United States Patent
Kim

(10) Patent No.: US 10,607,512 B2
(45) Date of Patent: Mar. 31, 2020

(54) COMMUNICATION DEVICE AND ELECTRONIC DEVICE COMPRISING THE SAME

(71) Applicant: LG INNOTEK CO., LTD., Seoul (KR)

(72) Inventor: Chang Wook Kim, Seoul (KR)

(73) Assignee: ATEC AP CO., LTD., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 16/060,732

(22) PCT Filed: Dec. 13, 2016

(86) PCT No.: PCT/KR2016/014576
§ 371 (c)(1),
(2) Date: Jun. 8, 2018

(87) PCT Pub. No.: WO2017/105054
PCT Pub. Date: Jun. 22, 2017

(65) Prior Publication Data
US 2018/0366041 A1  Dec. 20, 2018

(30) Foreign Application Priority Data
Dec. 15, 2015 (KR) .......................... 10-2015-0179608

(51) Int. Cl.
*G09F 3/20* (2006.01)
*H01Q 1/38* (2006.01)
(Continued)

(52) U.S. Cl.
CPC ................ *G09F 3/208* (2013.01); *G09F 3/20* (2013.01); *G09G 3/20* (2013.01); *H01Q 1/2208* (2013.01);
(Continued)

(58) Field of Classification Search
CPC ... G09F 3/20; H01Q 1/48; H01Q 1/24; H01Q 13/18; H01Q 5/364; H01Q 1/22; G09G 3/20; H04B 5/00
(Continued)

(56) References Cited

U.S. PATENT DOCUMENTS 5,348,485 A * 9/1994 Briechle ................ H01R 25/14
439/110
5,668,560 A * 9/1997 Evans ...................... H01Q 1/42
343/702
(Continued)

FOREIGN PATENT DOCUMENTS

CN 102771008 A 11/2012
JP 2007-529239 A 10/2007
(Continued)

OTHER PUBLICATIONS

International Search Report in International Application No. PCT/KR2016/014576, filed Dec. 13, 2016.
(Continued)

*Primary Examiner* — Nam V Nguyen
(74) *Attorney, Agent, or Firm* — Saliwanchik, Llyod & Eisenschenk

(57) ABSTRACT

A communication device according to an embodiment comprises: an antenna unit; and a grounding region for emitting a communication signal of the antenna unit, wherein the grounding region cannot overlap with another region inside the communication device, which includes a region in which the antenna unit is disposed.

14 Claims, 9 Drawing Sheets

(51) Int. Cl.
*H01Q 9/42* (2006.01)
*H01Q 1/22* (2006.01)
*G09G 3/20* (2006.01)
*H01Q 1/48* (2006.01)
*H04B 5/00* (2006.01)

(52) U.S. Cl.
CPC ................ *H01Q 1/38* (2013.01); *H01Q 1/48* (2013.01); *H01Q 9/42* (2013.01); *H04B 5/0037* (2013.01); *G09G 2330/00* (2013.01); *G09G 2370/022* (2013.01)

(58) Field of Classification Search
USPC ...... 340/5.91, 10.1–10.5; 343/835, 700, 702, 343/846; 235/61.7
See application file for complete search history.

(56) References Cited

U.S. PATENT DOCUMENTS

| | | | |
|---|---|---|---|
| 6,100,850 A | 8/2000 | Utsumi | |
| 6,184,834 B1 | 2/2001 | Utsumi et al. | |
| 6,307,751 B1* | 10/2001 | Bodony | G06F 1/16 361/679.08 |
| 6,344,823 B1* | 2/2002 | Deng | H01Q 9/0421 29/600 |
| 7,584,888 B2* | 9/2009 | Stephenson | G06F 3/14 235/383 |
| 10,249,957 B2* | 4/2019 | Chang | H01Q 13/18 |
| 2007/0146210 A1* | 6/2007 | Hilgers | H01Q 1/243 343/702 |
| 2007/0194885 A1 | 8/2007 | Lindgren | |
| 2008/0129632 A1* | 6/2008 | Moon | H01Q 1/243 343/848 |
| 2011/0037659 A1* | 2/2011 | Yanagi | H01Q 1/243 343/700 MS |
| 2011/0193757 A1 | 8/2011 | Choi et al. | |
| 2012/0120471 A1 | 5/2012 | Hämäläinen et al. | |
| 2012/0326849 A1* | 12/2012 | Relihan | G07G 1/145 340/10.6 |
| 2013/0285869 A1* | 10/2013 | Chung | H01Q 15/14 343/835 |
| 2014/0062802 A1 | 3/2014 | Seo et al. | |

FOREIGN PATENT DOCUMENTS

| | | |
|---|---|---|
| KR | 10-2009-0072100 A | 7/2009 |
| KR | 10-0980779 B1 | 9/2010 |
| KR | 10-2010-0126427 A | 12/2010 |
| KR | 10-2012-0114141 A | 10/2012 |
| KR | 10-2013-0054713 A | 5/2013 |
| SE | 0400581-5 | 3/2005 |

OTHER PUBLICATIONS

Supplementary European Search Report dated Dec. 3, 2018 in European Application No. 16875996.7.
Office Action dated Dec. 5, 2019 in Chinese Application No. 201680073590.8.

\* cited by examiner

COMMUNICATION DEVICE AND ELECTRONIC DEVICE COMPRISING THE SAME

CROSS-REFERENCE TO RELATED APPLICATIONS

This application is the U.S. national stage application of International Patent Application No. PCT/KR2016/014576, filed Dec. 13, 2016, which claims priority to Korean Application No. 10-2015-0179608, filed Dec. 15, 2015, the disclosures of each of which are incorporated herein by reference in their entirety.

TECHNICAL FIELD

The present invention relates to a communication device and electronic comprising the same.

BACKGROUND ART

Generally, products are displayed on shelves of distribution stores. Information such as selling prices for products, discount information, a unit price, and a place of origin, etc. is displayed on paper labels. The paper label is discarded when product information is changed or a product display position is changed. At this time, it is necessary to create a new paper label in order to display the changed product information. Therefore, the paper label causes continuous expenses for maintenance and repair. Also, the use of the paper label has a negative influence on environmental protection because paper, which is a raw material, is wasted in terms of an environmental aspect.

Recently, as a means for substituting a paper label, research and development on an electronic price indicator (or an electronic shelf label (ESL)) are being carried out. The ESL receives price-related information of a corresponding product from a central control center (server) through a wireless device (e.g., a gateway) and displays the received price-related information to provide information on the corresponding product in real time.

The ESL may display frequent changes in information, discount information, or the like of the corresponding product in real time via a display thereof. In order to provide user convenience, the ESL may display numerous pieces of information such as a store symbol, a promotion image, a barcode, a product name, a product image and place-of-origin information as well as price information.

The front part of the ESL includes a display for displaying product information and a bezel surrounding an outer periphery of the display. The size of the bezel may be reduced according to aesthetic properties and visibility. A near field communication antenna of the ESL may be located on the bezel. The performance of the near field communication antenna may be deteriorated according to decreasing of the size of the bezel.

DISCLOSURE

Technical Problem

An electronic device according to an embodiment may implement an antenna pattern of 2.4 GHz in a narrow antenna region.

An electronic device according to an embodiment may implement an antenna with a simple pattern.

An electronic device according to an embodiment may implement a sufficient grounding region for radiation of an antenna.

An electronic device according to an embodiment may implement an antenna having an optimal voltage stationary wave ratio.

An electronic device according to an embodiment may provide an arrangement structure of a power supply terminal and a grounding terminal of a near field communication antenna for optimizing the performance of the near field communication antenna in a region in which a near field communication antenna inside the electronic device is disposed.

An electronic device according to an embodiment may provide an arrangement structure of a radiation ground of the near field communication antenna for optimizing the performance of the near field communication antenna in a region in which a near field communication antenna inside the electronic device is disposed.

Technical Solution

A communication device according to an embodiment includes: an antenna unit; and a grounding region for radiating a communication signal of the antenna unit, wherein the grounding region may not be overlapped with other regions inside the communication device including a region in which the antenna unit is disposed.

An electronic device according to an embodiment includes: an antenna unit; and a grounding unit for radiating a communication signal of the antenna unit, and the grounding unit may be disposed in a region that is not overlapped with other regions inside the electronic device including a region in which the antenna unit is disposed.

Advantageous Effects

An electronic device according to an embodiment can provide an optimal antenna radiation efficiency by implementing an antenna pattern of 2.4 GHz in a narrow antenna region.

An electronic device according to an embodiment can provide an optimal antenna radiation efficiency by implementing an antenna with a simple pattern.

An electronic device according to an embodiment can provide an optimal antenna radiation efficiency by implementing a sufficient grounding region for radiation of an antenna.

An electronic device according to an embodiment can provide an optimal antenna radiation efficiency by implementing an antenna having an optimal voltage stationary wave ratio.

MODES OF THE INVENTION

Figure 1:
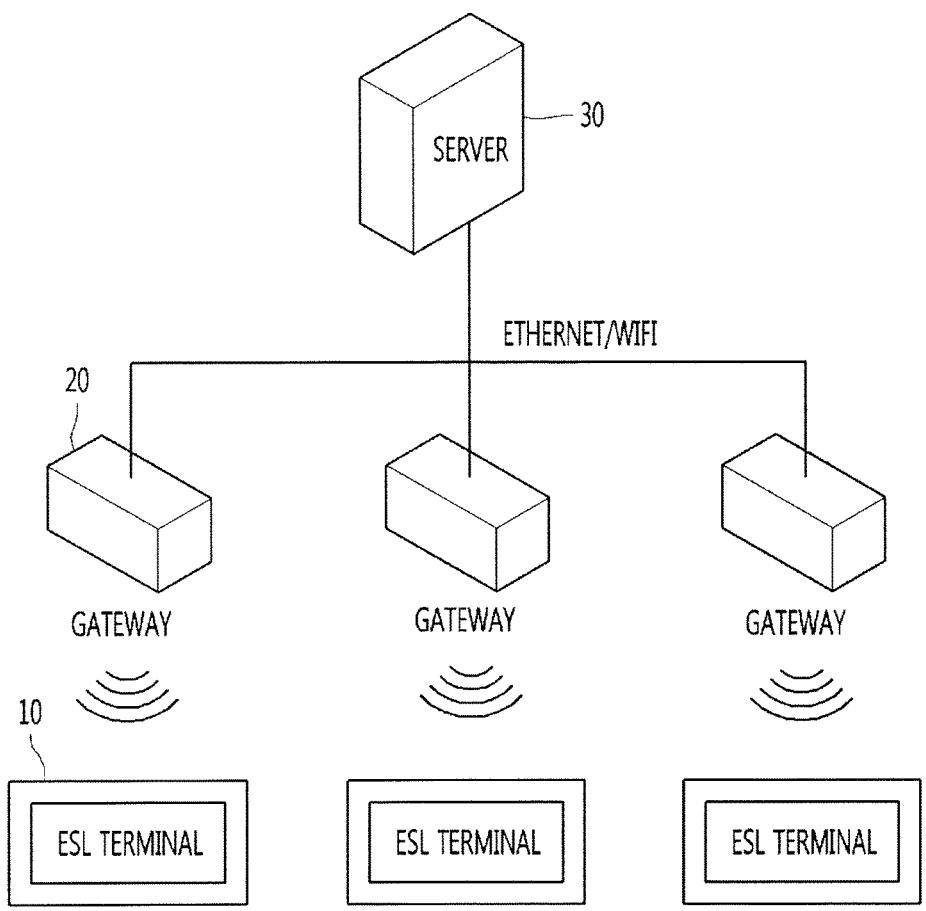
FIG. 1 illustrates a system including an electronic device according to an embodiment.

Advantages, features, and methods of achieving the same of the present invention will become clear upon referring to embodiments described below in detail with reference to the accompanying drawings. However, the present invention is not limited to the embodiments disclosed below and may be implemented in various other forms. The embodiments are merely provided to make the disclosure of the present invention complete and completely inform one of ordinary skill in the art to which the present invention pertains of the scope of the present invention. The present invention is defined only by the scope of the claims below. Like reference numerals refer to like elements throughout.

In describing embodiments, when detailed description of a known function or configuration is deemed to unnecessarily blur the gist of the present invention, the detailed description will be omitted. Terms described below are terms defined in consideration of functions in the embodiments and may vary depending on the intention of a user or operator or a practice. Therefore, such terms should be defined on the basis of the entire contents disclosed herein.

Combinations of blocks and steps of flowcharts in the accompanying drawings can be performed by computer program instructions. Such computer program instructions can be loaded in a processor of a general-purpose computer, a special-purpose computer, or other programmable data processing equipment. Therefore, the instructions performed by the processor of a computer or other programmable data processing equipment generate means for performing functions described in each of the blocks or each of the steps in the flowcharts in the drawings. Because the computer program instructions can also be stored in a computer-usable or computer-readable memory capable of supporting a computer or other programmable data processing equipment to implement a function in a specific way, the instructions stored in the computer-usable or computer-readable memory can also produce a manufacturing item which incorporates an instruction means performing a function described in each of the blocks or each of the steps of the flowcharts in the drawings. Because the computer program instructions can also be loaded in a computer or other programmable data processing equipment, the instructions performed in the computer or other programmable data processing equipment by generating a process executed in a computer by performing a series of operation steps in the computer or other programmable data processing equipment can also provide steps for executing functions described in each of the blocks and each of the steps of the flowcharts in the drawings.

Each of the blocks or each of the steps may represent a module, a segment, or a part of a code including one or more executable instructions for executing a specified logical function(s). Also, it should be noted that functions mentioned in the blocks or steps can also be performed in a different order in a few alternative embodiments. For example, two blocks or steps which are consecutively illustrated can substantially be performed simultaneously, or the blocks or steps can also be performed in a reverse order sometimes according to corresponding functions.

Hereinafter, embodiments will be described in more detail with reference to the drawings.

FIG. 1 illustrates a system including an electronic device according to an embodiment.

Referring to FIG. 1, an electronic device 10 may be referred to as an electronic shelf label (ESL) or an electronic shelf label terminal. The electronic device 10 may be installed on a shelf of a store such as a large-sized grocery store and a general store, and may display information of products such as a price. The electronic device 10 may communicate with a server 30 via a gateway located near the electronic device 10 among a plurality of gateways including a gateway 20.

The server 30 may be connected to a console (not shown). The console may refer to a device including a user interface for controlling the system. The server 30 may receive a user's command via the console. In addition, the gateway 20 and the electronic device 10 may receive the user's command via the console. In other words, the user may control the electronic device 10, the gateway 20, and the server 30 via the console.

The server 30 may transmit information of products to be displayed on the electronic device 10, for example, data such as a price, a product image, discount information, and bar code to the electronic device 10. The electronic device 10 may display the data received from the server 30.

The server 30 and the gateway 20 may be connected in wired or wireless manner. For example, the server 30 and the gateway 20 may communicate via ethernet or wireless fidelity (WI-FI).

The gateway 20 and the electronic device 10 may be connected wirelessly. For example, the electronic device 10 and the gateway 20 may be connected via Zigbee, Wi-Fi, or ultra wide band (UWB) communication.

The electronic device 10 may include a display that consumes power only when the electronic device 10 changes a displayed image. For example, the electronic device 10 may include a bistable cholesteric display (BCD) or an electronic ink display. The electronic device 10 may periodically transmit an alive signal to the server 30. The server 30 may determine whether the electronic device 10 normally operates via the alive signal received from the electronic device 10.

Each of the electronic devices may have a specific identifier (ID). When the server 30 communicates with the electronic device 10, the server 30 may use an ID of the electronic device 10 as an address.

The ID may be set by an administrator when the electronic device 10 is initially installed on a shelf of a store. The administrator may assign an ID to the electronic device 10 by using a hand-held device. The ID may be registered in the server 30 by the administrator.

When the ID of the electronic device 10 is registered to the server 30, the administrator may change an image displayed on the electronic device 10 via the server 30.

Further, the administrator may transmit a control signal to the electronic device 10 via the server 30 to control the electronic device 10.

Figure 2:
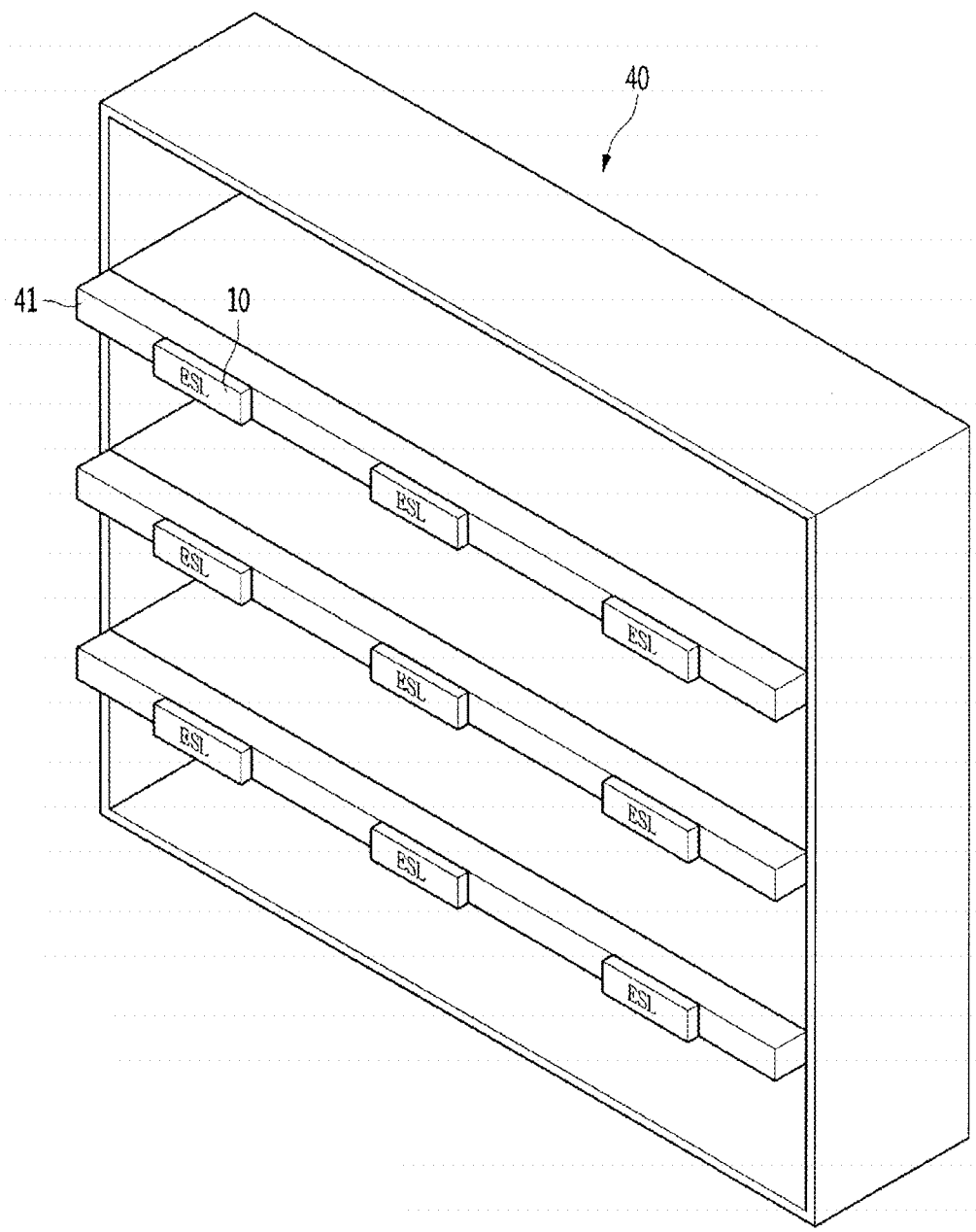
FIG. 2 illustrates an example in which electronic devices according to an embodiment are disposed.

FIG. 2 illustrates an example in which electronic devices according to an embodiment are disposed.

FIG. 2 illustrates a shelf 40 installed an electronic device 10 according to the embodiment. The shelf 40 may have a plurality of layers. Products may be placed on each shelf. A label mount 41 may be installed at a front surface of a lower end of each layer of the shelf 40. Electronic devices including the electronic device 10 may be installed at the label mount 41.

Figure 3:
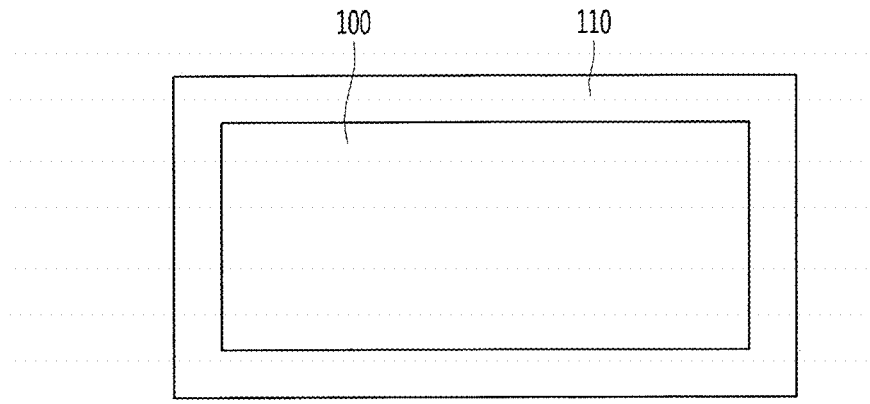
FIG. 3 is a front view of an electronic device according to an embodiment.

FIG. 3 is a front view of an electronic device according to an embodiment.

Referring to FIG. 3, a display unit 100 may be located at a front surface of the electronic device 10 according to the embodiment. A bezel 110 may be located at an outer periphery of the display unit 100. The display unit 100 may be driven with low power and may be a bistable cholesteric display that consumes power only when an image is updated. The display unit 100 may display information of products to provide to a consumer, such as a product name, a product price, discount information, and the like.

Figure 4:
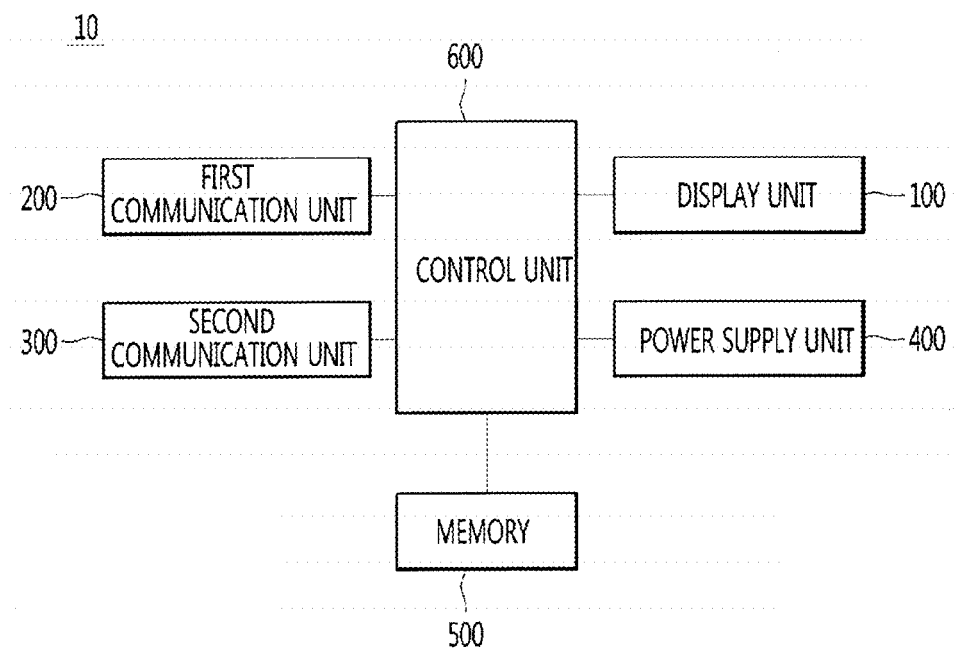
FIG. 4 is a block configuration diagram of an electronic device according to an embodiment.

FIG. 4 is a block configuration diagram of an electronic device according to an embodiment.

Referring to FIG. 4, an electronic device 10 according to the embodiment may include a display unit 100, a first communication unit 200, a second communication unit 300, a power supply unit 400, a memory 500, and control unit 600.

The first communication unit 200 may transmit and receive a communication signal in a near field communication method. The first communication unit 200 may perform a near field communication according to a predetermined communication method. For example, the communication method may be a near field communication (NFC), ZigBee, Wi-Fi, Bluetooth, or Z-wave method.

The second communication unit 300 may transmit and receive a communication signal via a commercial wired and wireless communication network. For example, the second communication unit 300 may transmit and receive the communication signal with the server 30. The second communication unit 300 may transmit and receive the communication signal according to a predetermined communication method. The communication method may include a data communication method.

The power supply unit 400 may apply power to the electronic device 10. The power supply unit 400 may supply power to the electronic device 10. The power supply unit 400 according to another embodiment may be referred to as an electric power supply unit.

The memory 500 may store programs for an overall operation of the electronic device 10. The memory 500 may store data generated during running of programs.

The control unit 600 may control an overall operation of the electronic device 10. The control unit 600 may control the first communication unit 200 to receive information on products from the server 30. In addition, the control unit 600 may control the memory 500 to store information in the memory 500.

The display unit 100 may display data according to a control of the control unit 600. The display unit 100 may display information on products. The display unit 100 may display information on the electronic device 10.

Figure 5:
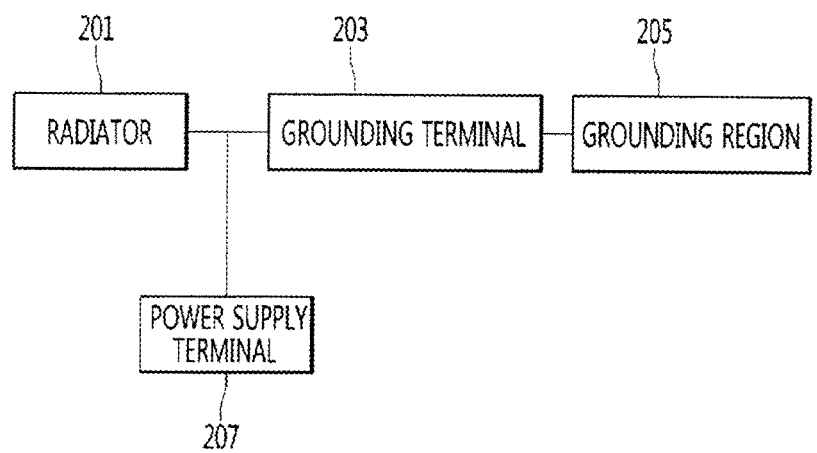
FIG. 5 is a block configuration diagram of a first communication unit of an electronic device according to an embodiment.

FIG. 5 is a block configuration diagram of a first communication unit of an electronic device according to an embodiment.

Referring to FIG. 5, a first communication unit 200 of an electronic device 10 may include a radiator 201, a grounding terminal 203, and a power supply terminal 207. According to another embodiment, the first communication unit 200 may be referred to as an antenna or an antenna unit. The electric power supply terminal 207 may be referred to as an electric power supply terminal. According to another embodiment, the first communication unit 200 may further include a grounding region 205.

The radiator 201 may be a device for transmitting and receiving signals for data. The radiator 201 may receive power from an electric power supply unit (not shown) via the electric power supply terminal 207. The radiator 201 may be grounded to the grounding region 205 via the grounding terminal 203. The radiator 201 may radiate electromagnetic waves via the grounding region 205. That is, the grounding region 205 may radiate a communication signal of the radiator 201.

The electronic device 10 according to an embodiment may include an antenna unit 200 and a grounding region 205 for radiating a communication signal of the antenna unit 200. The grounding region 205 may be disposed in a region that is not be overlapped with other regions inside the electronic device 10 including a region in which the antenna unit 200 is disposed.

The antenna unit 200 may include the radiator 201 for transmitting and receiving a communication signal and the grounding terminal 203 for connecting the radiator 201 and the grounding region 205. The electronic device 10 may include the electric power supply terminal 207 for receiving power.

The electronic device 10 may further include the electric power supply unit (not shown). The power supply terminal 207 may receive power from the electric power supply unit. The grounding terminal 203 may ground the power to the grounding region 205. The grounding terminal 203 and the power supply terminal 207 may be located on the same plane and may be disposed to be orthogonal to each other.

The electronic device 10 according to an embodiment may further include a display module (not shown). The electronic device 10 according to an embodiment may further include a bezel (not shown) disposed in a region except a region in which the display module is disposed. The antenna unit 200 and the grounding region 205 may be disposed on the bezel 110.

Figure 6:
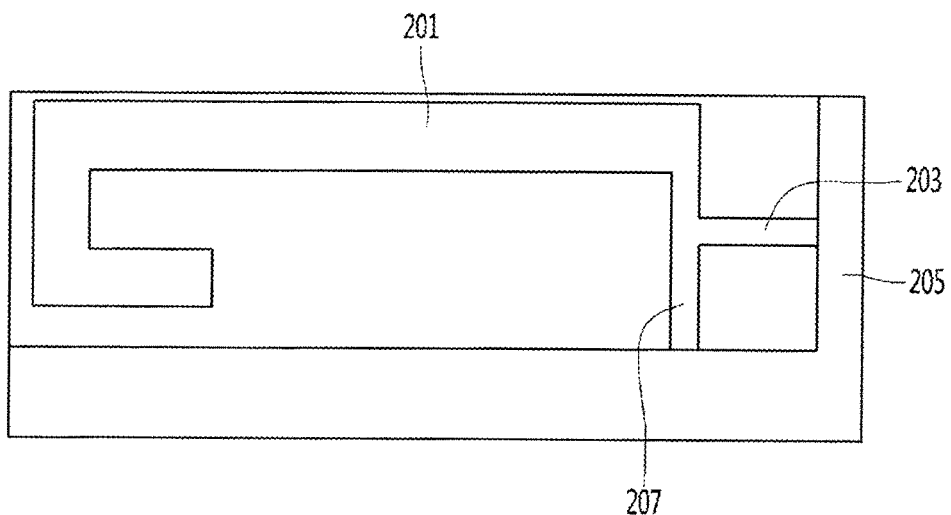
FIG. 6 illustrates a first communication unit of an electronic device according to an embodiment.

FIG. 6 illustrates a first communication unit of an electronic device according to an embodiment.

Referring to FIG. 6, an electronic device 10 may include a radiator 201 for transmitting and receiving a communication signal, a grounding region 205, a electric power supply terminal 207 for receiving power, and a grounding terminal 203 for grounding to the grounding region 205. The electric power supply terminal 207 and the grounding terminal 203 may be disposed in a direction orthogonal to each other on the same plane.

Figure 7:
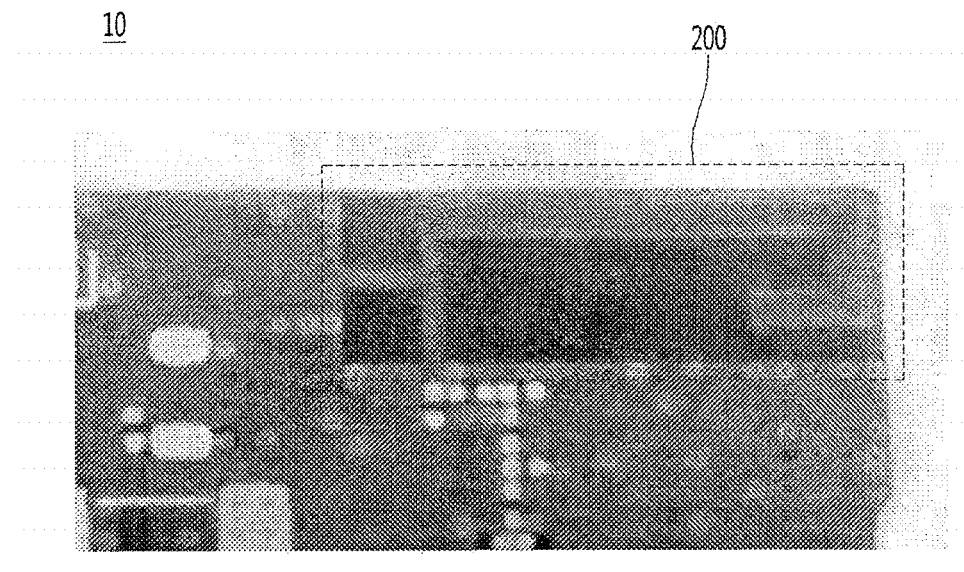
FIG. 7 illustrates an example of implementing a first communication unit of an electronic device according to an embodiment.

FIG. 7 illustrates an example of implementing a first communication unit of an electronic device according to an embodiment.

Referring to FIG. 7, the first communication unit 200 of the electronic device 10 according to an embodiment may be mounted on a printed circuit board (PCB).

Figure 8:
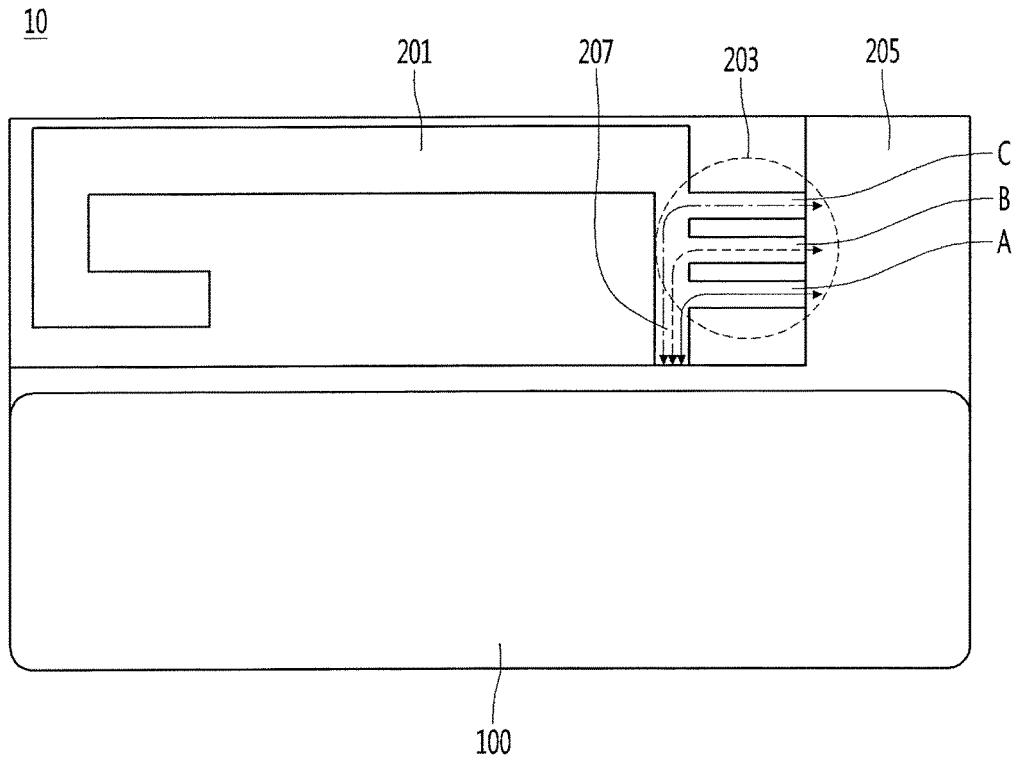
FIG. 8 illustrates a first communication unit of an electronic device according to another embodiment.

FIG. 8 illustrates a first communication unit of an electronic device according to another embodiment.

Referring to FIG. 8, an arrangement of a grounding terminal 203 of a first communication unit 200 of an electronic device 10 may be changed. For example, the grounding terminal 203 may be located at one of A, B, and C. The electronic device 10 according to an embodiment may have a different ground loop depending on a position of the grounding terminal 203. The first communication unit 200 may be referred to as an antenna unit.

The electronic device 10 according to an embodiment may include an antenna unit 200 and a grounding region 205 for radiating a communication signal of the antenna unit 200. The grounding region 205 may not be overlapped with other regions inside the communication device including the region in which the antenna unit 200 is disposed.

The antenna unit 200 may include a radiator 201 for transmitting and receiving a communication signal, the grounding terminal 203 for connecting the radiator 201 and the grounding region 205, and a power supply terminal 207 for receiving power. The electronic device 10 may further include a electric power supply unit (not shown). The electric power supply terminal 207 may receive power from the electric power supply unit.

The grounding terminal 203 may ground the power to the grounding region 205. The grounding terminal 203 and the electric power supply terminal 207 may be located on the same plane and disposed to be orthogonal to each other. The electronic device 10 may further include a display module (not shown). The grounding region 205 may not be overlapped with the region in which the display module is disposed.

Figure 9:
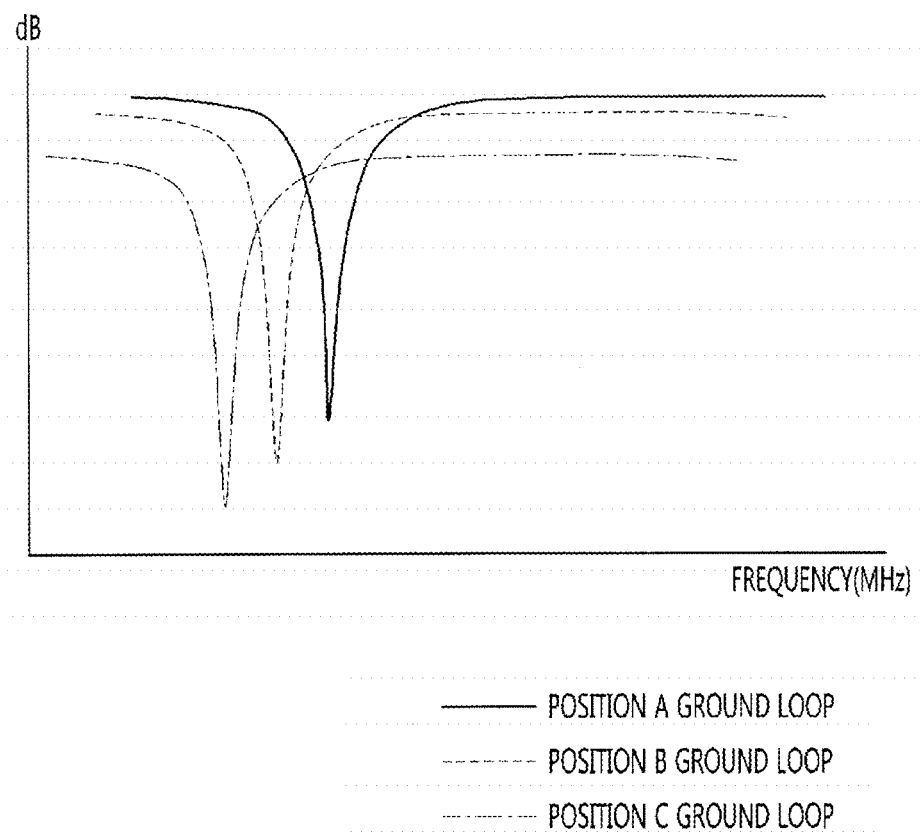
FIG. 9 is an antenna characteristic graph according to a position of a grounding terminal of an electronic device according to an embodiment.

FIG. 9 is an antenna characteristic graph according to a position of a grounding terminal of an electronic device according to an embodiment.

Referring to FIG. 9, the antenna characteristic of the electronic device may vary depending on a position of the grounding terminal of the electronic device. For example, when the grounding terminal is disposed at position A in FIG. 8, a higher frequency and dB may be obtained than when the grounding terminal is disposed at position B. In addition, when the grounding terminal is disposed at the position B in FIG. 8, a lower frequency and dB may be obtained than when the grounding terminal is disposed at the position A, and a higher frequency and dB may be obtained than when the grounding terminal is disposed at the position C.

Figure 10:
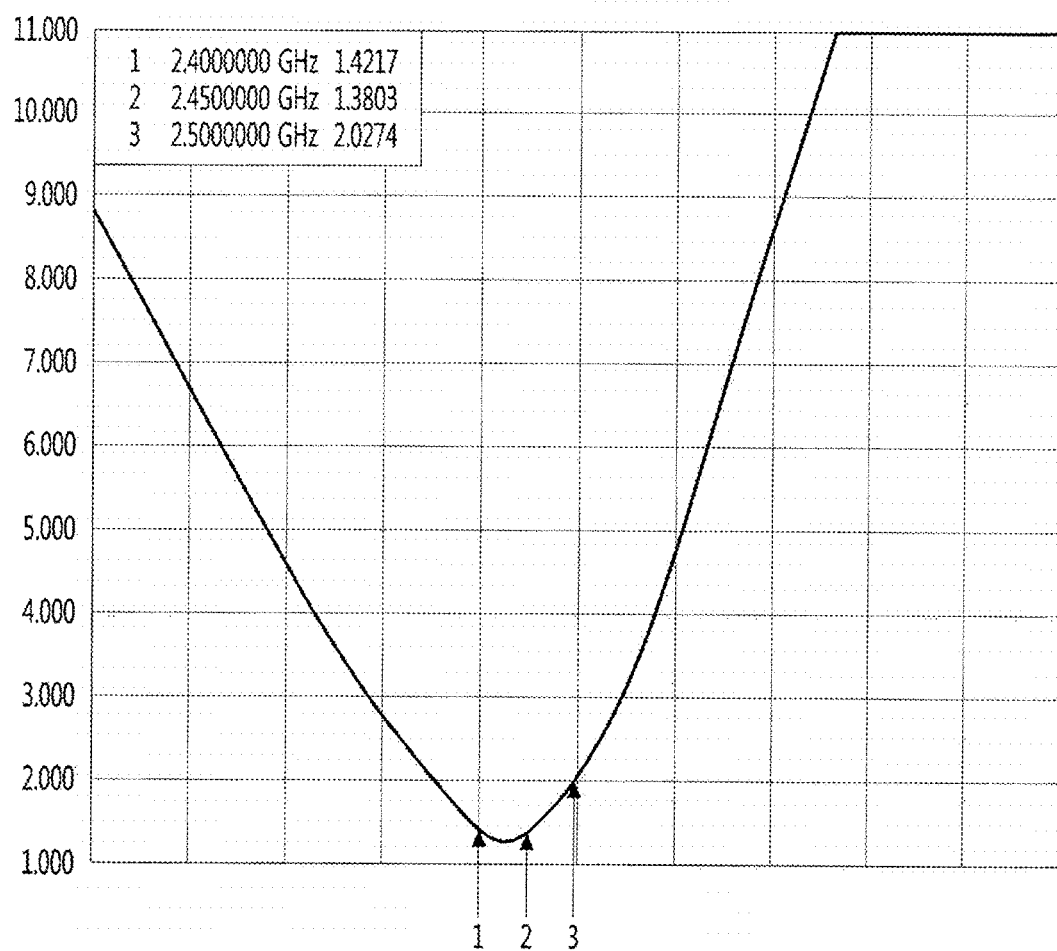
FIG. 10 is a graph of a voltage standing wave ratio (VSWR) measured according to a frequency of an antenna of an electronic device 10 according to another embodiment.

FIG. 10 is a graph of a voltage standing wave ratio (VSWR) measured according to a frequency of an antenna of an electronic device according to another embodiment.

A stationary wave is a concept that contrasts with a progressive wave, which is a wave progressing in an arbitrary direction in a space, and may mean a wave in which a node of vibration is fixed. The stationary wave may also be generated by composition of waves when the waves having the same amplitude and frequency move in opposite directions. The standing wave may be referred to as a stationary wave or a standing wave. The standing wave may reduce antenna performance.

The voltage standing wave ratio may mean a ratio of the amplitude of a voltage (or electric field) at a maximum voltage point to the amplitude of a voltage (or electric field) at an adjacent minimum voltage point in standing waves generated from a transmission line of an antenna.

Referring to FIG. 10, the electronic device according to an embodiment may have a voltage standing wave ratio of 1.42:1 when the frequency is 2.4 GHz (1). The electronic device may have a voltage standing wave ratio of 1.38:1 when the frequency is 2.45 GHz (2). The electronic device may have a voltage standing wave ratio of 2.03:1 when the frequency is 2.5 GHz (3). That is, the antenna of the electronic device 10 according to an embodiment may have a voltage standing wave ratio of less than 3:1.

FIG. 10 may be summarized as shown in Table 1 below.

TABLE 1

| Frequency (MHz) | Voltage Standing Wave Ratio (VSWR) |
|---|---|
| 2405 | 1.42.1 |
| 2440 | 1.38.1 |
| 2480 | 2.03.1 |

Figure 11:
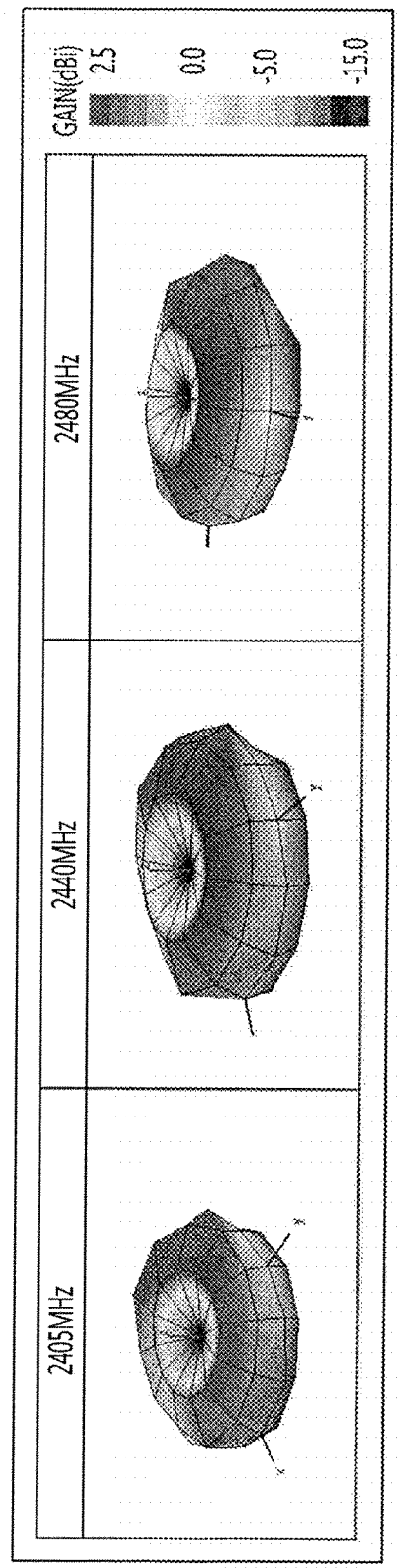
FIG. 11 is a radiation graph according to a frequency of an antenna of an electronic device according to another embodiment.

FIG. 11 is a radiation graph according to a frequency of an antenna of an electronic device according to another embodiment.

The radiation graph according to the frequency of the antenna of the electronic device according to an embodiment may be as shown in FIG. 11. The efficiency, gain, and directionality according to the frequency of the antenna of the electronic device are as shown in Table 2 below.

TABLE 2

| Frequency (MHz) | 2405 | 2440 | 2480 |
|---|---|---|---|
| Efficiency (dB) | −2.12 | −2.26 | −3.22 |
| Efficiency (%) | 61.41 | 59.39 | 47.63 |
| Maximum gain (dB) | 1.32 | 0.89 | 0.25 |
| Directionality (dB) | 3.44 | 3.15 | 3.50 |
| Minimum gain (dB) | −14.33 | −11.07 | −11.34 |
| Average efficiency (%) | | 57.15 | |

The electronic device according to an embodiment may have an average antenna efficiency of 57.15%. The antenna efficiency of an electronic device according to the related art is known as an average of 30%. That is, the electronic device according to an embodiment may have a higher antenna efficiency than that of the related art.

Figure 12:
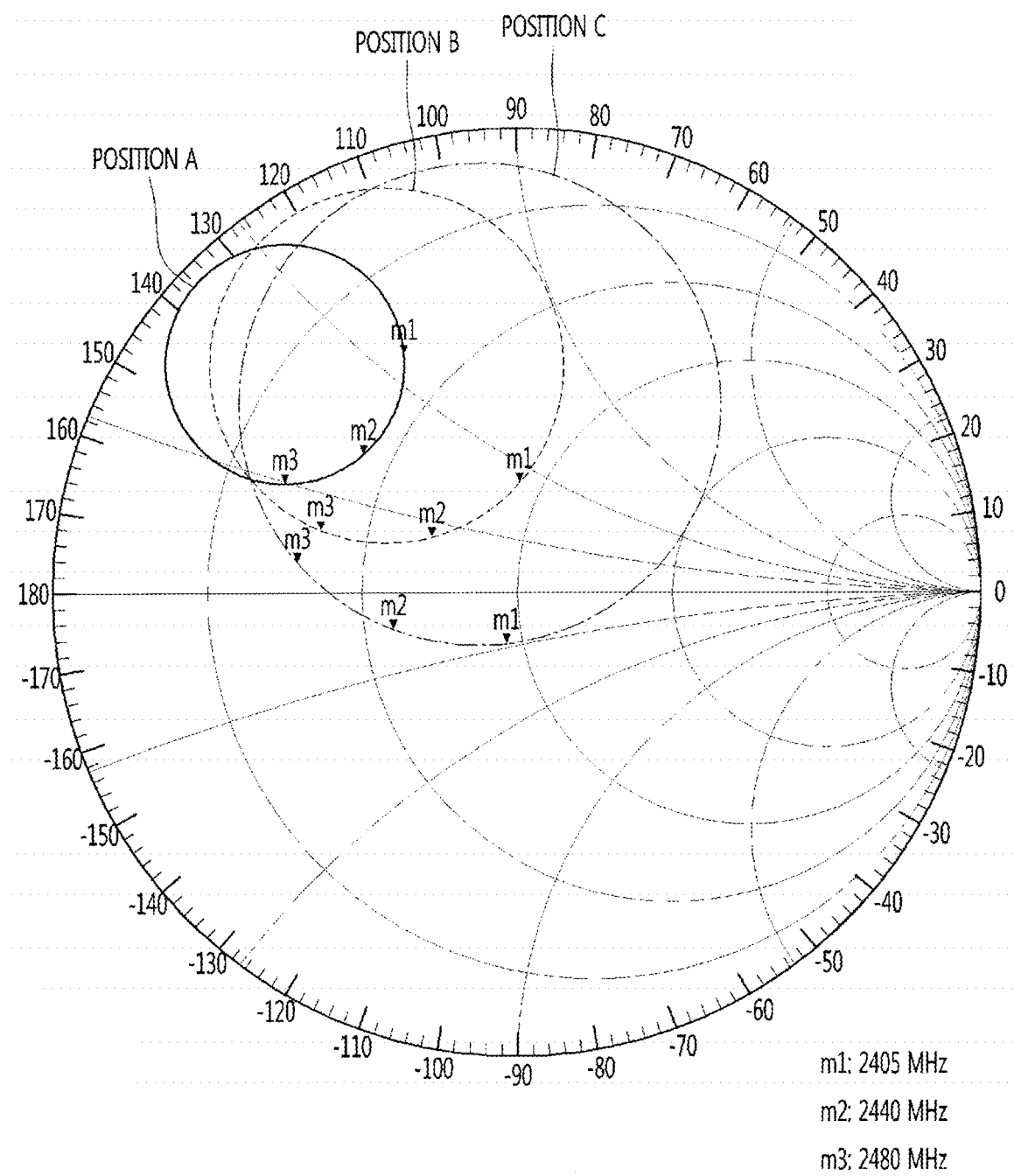
FIG. 12 is a smith chart according to a position of a grounding terminal of an electronic device according to another embodiment.

FIG. 12 is a smith chart according to a position of a grounding terminal of an electronic device according to another embodiment.

Referring to FIG. 12, an antenna characteristic may vary depending on a position of the grounding terminal of the electronic device according to an embodiment. That is, in FIG. 8, depending on where the position of the grounding terminal of the electronic device is located at any one of A, B, and C, the antenna characteristic may vary as shown in the smith chart of FIG. 12. A size of the volume between the grounding terminal and the power supply terminal of the electronic device may vary depending on a position of the grounding terminal of the electronic device. The antenna characteristic of the electronic device may vary depending on a size of the volume between the grounding terminal and the power supply terminal.

The electronic device according to the embodiment can provide an optimal antenna radiation efficiency by implementing an antenna pattern of 2.4 GHz in a narrow antenna region. The electronic device according to the embodiment can provide an optimal antenna radiation efficiency by implementing an antenna with a simple pattern. The electronic device according to the embodiment can provide an optimal antenna radiation efficiency by implementing a sufficient grounding region for radiation of an antenna. The electronic device according to the embodiment can provide an optimal antenna radiation efficiency by implementing an antenna having an optimal voltage stationary wave ratio. The electronic device according to the embodiment may not install an additional gateway by disposing an antenna with an optimal antenna pattern in a narrow region in which the antenna is disposed to ensure antenna performance.

INDUSTRIAL APPLICABILITY

The present invention may be used in the antenna industry.

The invention claimed is:

1. A communication device comprising:
a display module; and
a communication unit for receiving data to be displayed via the display module,
wherein the communication unit includes:
an antenna unit; and
a grounding region for radiating a communication signal of the antenna unit,
wherein the grounding region is not overlapped, in a vertical direction perpendicular to an upper surface of the display module, with a region in which the display module is disposed,
wherein the antenna unit and the grounding region are coplanar and are disposed in a first plane,
wherein the antenna unit includes:
a radiator for transmitting and receiving the communication signal;
a grounding terminal for connecting the radiator and the grounding region; and
an electric power supply terminal for receiving power,
wherein the radiator, the grounding terminal, and the electric power supply terminal are all disposed in the first plane,
wherein the radiator comprises a first portion extending in a first lateral direction perpendicular to the vertical direction, a second portion extending away from the first portion in a second lateral direction perpendicular to both the vertical direction and the first lateral direction, and a third portion extending away from the second portion in a third lateral direction opposite to the first lateral direction, such that the first portion, the second portion, and the third portion of the radiator form a hook shape in the first plane, and
wherein the grounding region comprises a first ground portion extending in the first lateral direction and for connecting the electric power supply terminal, and a second ground portion bending and extending away from the first ground portion in the second lateral direction and for connecting the grounding terminal, such that the first ground portion and the second ground portion form an L shape in the first plane.

2. The communication device of claim 1, wherein a region in which the radiator, the grounding terminal, and the electric power supply terminal are disposed is not overlapped, in the vertical direction, with the region in which the display module is disposed.

3. The communication device of claim 1, comprising an electric power supply unit for providing the power to the electric power supply terminal,
wherein the grounding terminal grounds the power to the grounding region.

4. The communication device of claim 1, wherein the antenna unit has a voltage standing wave ratio of less than 3:1.

5. The communication device of claim 1, comprising a bezel disposed at an outer periphery of the display module,
wherein the communication unit is disposed on the bezel.

6. The communication device of claim 1, wherein the grounding terminal extends away from the radiator in the third lateral direction, and
wherein the electric power supply terminal extends away from the radiator in the second lateral direction.

7. The communication device of claim 6, wherein the display module is disposed in the first plane and is coplanar with the antenna unit and the grounding region.

8. The communication device of claim 1, wherein the display module is disposed in the first plane and is coplanar with the antenna unit and the grounding region.

9. An electronic device comprising:
a display module for displaying data;
a communication unit configured to communicate with a server to receive the data;
a power supply unit configured to supply power to the display module and the communication unit; and
a control unit configured to control operations of the display module, the communication unit, and the power supply unit,
wherein the communication unit is located in a region which is not overlapped, in a vertical direction perpendicular to an upper surface of the display module, with a region in which the display module is disposed,
wherein the communication unit includes an antenna unit and a grounding region for radiating a communication signal of the antenna unit,
wherein the antenna unit and the grounding region are coplanar and are disposed in a first plane,
wherein the antenna unit includes:
a radiator for transmitting and receiving the communication signal;
a grounding terminal for connecting the radiator and the grounding region; and
an electric power supply terminal for receiving power,
wherein the radiator, the grounding terminal, and the electric power supply terminal are all disposed in the first plane,
wherein the radiator comprises a first portion extending in a first lateral direction perpendicular to the vertical direction, a second portion extending away from the first portion in a second lateral direction perpendicular to both the vertical direction and the first lateral direction, and a third portion extending away from the second portion in a third lateral direction opposite to the first lateral direction, such that the first portion, the second portion, and the third portion of the radiator form a hook shape in the first plane, and
wherein the grounding region comprises a first ground portion extending in the first lateral direction and for connecting the electric power supply terminal, and a second ground portion bending and extending away from the first ground portion in the second lateral direction and for connecting the grounding terminal, such that the first ground portion and the second ground portion form an L shape in the first plane.

10. The electronic device of claim 9, comprising a bezel disposed at an outer periphery of the display module,
wherein the communication unit is disposed on the bezel.

11. The electronic device of claim 9, wherein the electronic device is an Electronic Shelf Label (ESL).

12. The electronic device of claim 9, wherein the grounding terminal extends away from the radiator in the third lateral direction, and
wherein the electric power supply terminal extends away from the radiator in the second lateral direction.

13. The electronic device of claim 12, wherein the display module is disposed in the first plane and is coplanar with the antenna unit and the grounding region.

14. The electronic device of claim 9, wherein the display module is disposed in the first plane and is coplanar with the antenna unit and the grounding region.

\* \* \* \* \*